United States Patent [19]

Jozefowicz et al.

[11] Patent Number: 5,218,472
[45] Date of Patent: Jun. 8, 1993

[54] OPTICAL INTERFERENCE STRUCTURES INCORPORATING POROUS FILMS

[75] Inventors: Mark A. Jozefowicz; Aron M. Rosenfeld, both of Kingston, Canada

[73] Assignee: Alcan International Limited, Montreal, Canada

[21] Appl. No.: 827,563

[22] Filed: Jan. 28, 1992

Related U.S. Application Data

[63] Continuation of Ser. No. 497,222, Mar. 22, 1990, abandoned.

[30] Foreign Application Priority Data

Mar. 22, 1989 [CA] Canada .................. 594495
Sep. 29, 1989 [CA] Canada .................. 615000

[51] Int. Cl.$^5$ ............................... G02B 5/28
[52] U.S. Cl. .................... 359/584; 359/585; 427/162; 428/550
[58] Field of Search ........... 350/164, 166, 1.6, 1.7; 428/548, 550; 427/162

[56] References Cited

U.S. PATENT DOCUMENTS

| | | |
|---|---|---|
| 3,811,752 | 5/1974 | Jaklevic et al. ............. 350/164 |
| 4,115,212 | 9/1978 | Patrie et al. . |
| 4,126,582 | 11/1978 | Diem et al. . |
| 4,310,586 | 1/1982 | Sheasby et al. . |
| 4,431,707 | 2/1984 | Burns et al. . |
| 4,472,533 | 9/1984 | Moskovits et al. . |

FOREIGN PATENT DOCUMENTS

| | | |
|---|---|---|
| 0178831 | 4/1986 | European Pat. Off. . |
| 0272089 | 6/1988 | European Pat. Off. . |
| 3124522 | 1/1983 | Fed. Rep. of Germany . |
| 53-1187 | 1/1978 | Japan . |
| 53-22185 | 1/1978 | Japan . |
| 6033390 | 2/1985 | Japan . |
| 60-177198 | 9/1985 | Japan . |
| 1532235 | 11/1978 | United Kingdom . |
| 2072705 | 10/1981 | United Kingdom . |

OTHER PUBLICATIONS

Pastore et al.—*Thin Solid Films*, 173 (1989) 299–308 General Film Behaviour—"Electrocolouring of Anodized Aluminum. . . ".

Mizuki; et al—*Metal Surface Technology* 38, (12) 1987 pp. 561–563—translation "Electrochemical Incorporation . . .".

Thomas—"Optical coatings by the sol-gel process" *Optics News*—Aug. 1986, pp. 18 to 22.

*Primary Examiner*—Martin Lerner
*Attorney, Agent, or Firm*—Cooper & Dunham

[57] ABSTRACT

Optical interference structures incorporating porous films are disclosed. These structures are capable of exhibiting a color by interference effects caused by the interference of light reflected from various layers within the structure. Basically, the structures comprise a reflective substrate, a porous transparent dielectric film on the substrate and at least one semi-transparent layer supported by the porous dielectric film. The structure is such that there are at least two reflective surfaces separated by an optically thin porous layer of the dielectric film. These structures can be formed by several methods, but the most convenient involves the porous anodization of a substrate metal (e.g. aluminum) to form the dielectric film and the deposition of a semi-transparent metal layer within the pores or on the film surface. The structures can be made inexpensively and are capable of generating strong and, if desired, dichroic colors. The porous nature of the film can also be exploited to create color shifts. The structures can be used for decorative purposes or to create a wide range of indicators, sensors, security devices and the like.

30 Claims, 4 Drawing Sheets

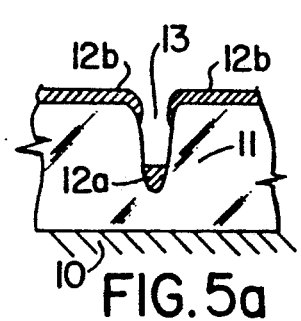 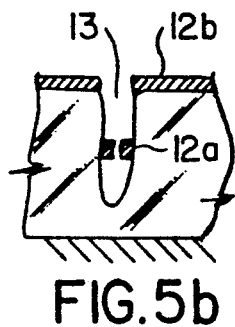 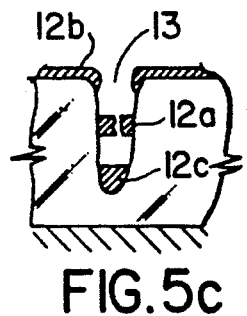
FIG.5a　　　FIG.5b　　　FIG.5c
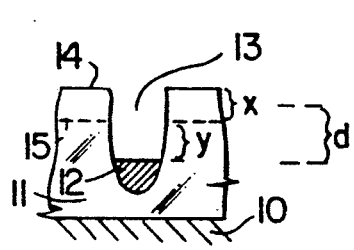 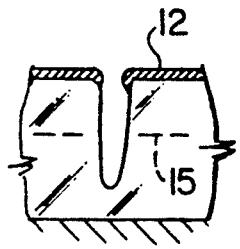 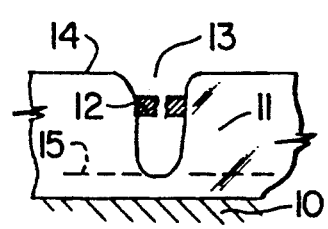
FIG.5d　　　FIG.5e　　　FIG.5f
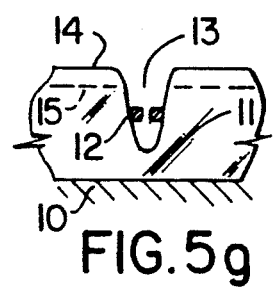 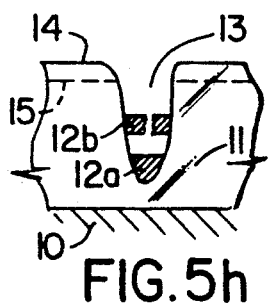 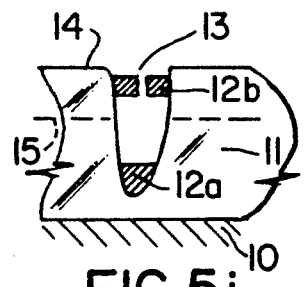
FIG.5g　　　FIG.5h　　　FIG.5i
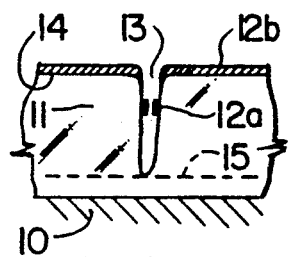 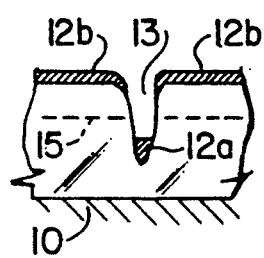 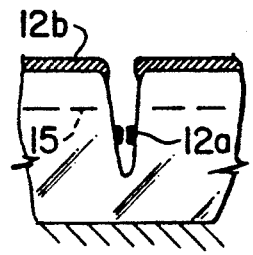
FIG.5j　　　FIG.5k　　　FIG.5ℓ

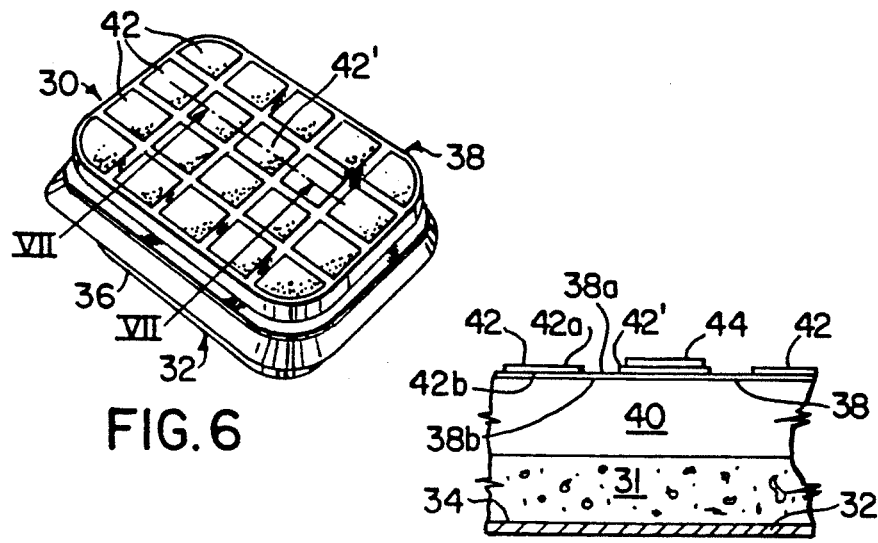
FIG. 6
FIG. 7
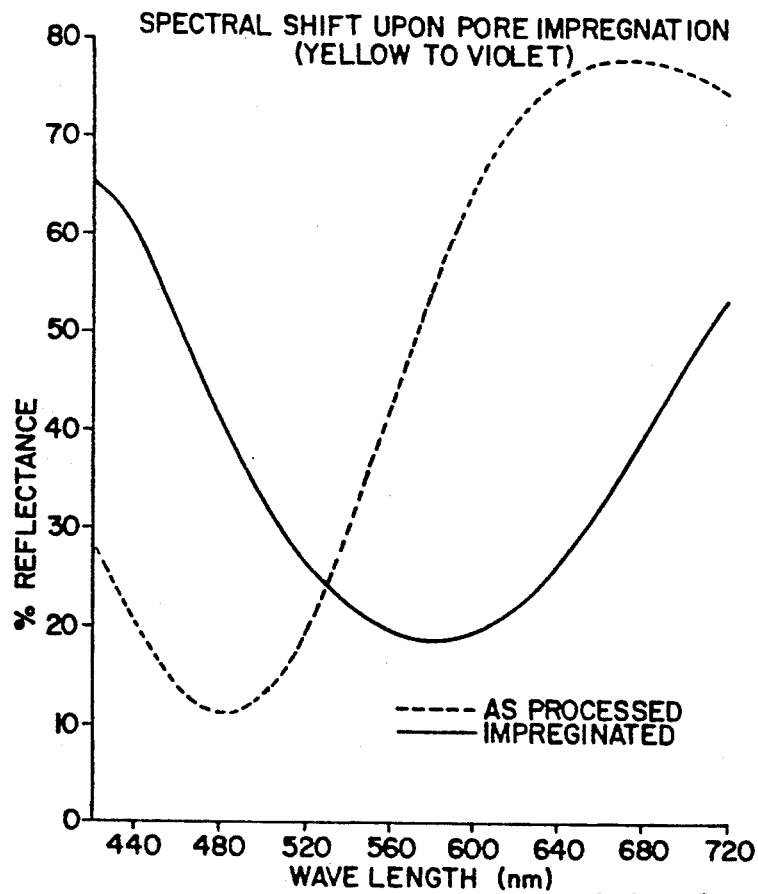
FIG. 9

OPTICAL INTERFERENCE STRUCTURES INCORPORATING POROUS FILMS

This is a continuation of application Ser. No. 497,222, filed Mar. 22, 1990 now abandoned.

BACKGROUND OF THE INVENTION

I. Field of the Invention

This invention relates to optical interference structures capable of filtering the visible spectrum into one or more bands of relatively high reflectance bounded by bands of relatively low reflectance, thus exhibiting a coloured appearance when illuminated with white light. More particularly, the invention relates to optical interference structures of this kind incorporating porous dielectric films.

II. Description of the Prior Art

It is known that a variety of structures are capable of producing interference colours of the type mentioned above. One class of known optical interference structure employs multiple transparent or semi-transparent layers to achieve the filtering effect. There are two basic designs, namely the all-dielectric stack (multiple thin layers of dielectric material of alternating high and low refractive index) and metal-dielectric stacks (alternating metal and dielectric layers, with all of the metal layers being semi-transparent) except for an opaque bottom layer when used in the reflection mode.

In these structures, multiple reflections from the various layers lead to a filtering action due to constructive or destructive interference of light in different wavelength bands. These two filter types are the basis of precision optical elements for a variety of applications such as lens coatings.

One limitation of these conventional structures is that they are produced by costly techniques involving vacuum deposition methods such as evaporation and sputtering; this restricts their use to precision optics or high value coatings. In particular, dramatic colour effects arising from the filtering action of such structures in the visible region of the spectrum are normally not exploited for consumer applications.

A second limitation of conventional multilayer stacks is the instability of their optical response arising from effects due to moisture adsorption. Voids are present in dielectric layers as they are normally produced by vacuum deposition and these permit the penetration of atmospheric moisture into the film over a period of weeks which shifts the characteristics of narrow band filters from their designed response. This problem is well-known in the optical coating industry and great emphasis has been placed on finding new deposition methods to minimize the void fraction and obtain maximally dense films. With present technology, densities of dielectric films are usually in the range of 80-95% of bulk values and often in excess of 90%.

In contrast to this, in the past, we have created optical interference effects in structures which incorporate highly porous anodic films. This developed from the need to colour the surfaces of anodized aluminum articles. Anodizing is a well known technique for producing decorative and protective coatings on aluminum or aluminum alloys (see, for example, the monograph entitled "The Surface Treatment and Finishing of Aluminum and Its Alloys" by S. Wernick and R. Pinner, Robert Draper Ltd., UK, 1972). Anodizing of aluminum in selected electrolytes produces an oxide film consisting of an outer layer containing a dense array of fine pores orientated perpendicularly to the treated surface and an inner non-porous barrier layer of compact oxide separating the porous layer from the underlying aluminum. The anodic film is normally transparent or translucent depending on the film thickness. Films that are at least several micrometers thick (generally $10\mu$ or more) are hard and durable and are used as protective coatings.

For decorative applications, such films have been coloured by the electrolytic deposition of a metal or metal compound (inorganic pigment) into the pores as also described in the above cited monograph by Wernick and Pinner. The colours that can be obtained in this way are rather limited, ranging from brown through bronze shades to black as the pores are increasingly filled with pigmentary deposit. The colouring effect is due to scattering and absorption by the deposit within the anodic film of light reflected from the surface of the underlying aluminum metal.

In our British Patent Specification No. 1,532,235 on Nov. 15, 1978 (the disclosure of which is incorporated herein by reference), we have described products in which a new range of colours can be obtained by electrocolouring, the colour being due to optical interference in addition to the scattering and absorption effects already noted. In this process, the pigmentary deposit is controlled so as to be thinner than in the original electrocolouring process and the heights of the deposits are made more uniform throughout the film. The generated colour is the result of interference between light reflected at the outer ends (relative to the aluminum surface) of the individual deposits and light reflected at the aluminum/aluminum oxide interface. The colour produced depends on the difference in optical path resulting from separation of the two light reflecting surfaces (the tops of the deposits and the underlying aluminum surface) and is selected by controlling the height of the deposits. Practically useful colour effects can thus be realized, though the colours tend to be pastel-like for thinner deposits and to have a somewhat muddy appearance for thicker deposits, probably due to the increased contribution of the scattering and absorption effects, noted above, to the interference effects. The appealing colour effects that can be achieved by this "first generation" interference structure are thus somewhat limited.

In our subsequent U.S. Patent No. 4,310,586 published on Jan. 12, 1982 (the disclosure of which is incorporated herein by reference), we described the achievement of significantly clearer and brighter colours by growing additional oxide film beneath relatively shallow deposits. These colours are due to the same interference effect between light reflected from the same two reflecting surfaces as in the first generation structure described above. In this case, however, the colour is selected not by varying the height of the metal deposits, but by continued anodizing after the electrodeposition stage to thicken the oxide below the deposit. The difference in optical path between light reflected from the tops of the deposits and from the aluminum surface is thus controlled, along with the colour, by moving the aluminum surface relative to the tops of the deposits rather than vice versa as in the previous case. In these "second generation" interference structures, a wider range of bright colours is accessible because the separation of the two reflecting surfaces can be varied more widely without increasing the thickness of the deposit and hence the associated scattering and absorption effects.

In all of these previously described coloured anodic film structures, the thickness of the porous anodic film is greater than 3 micrometers and typically from 10–20 micrometers. Interference effects in these films are between light reflected from the metal deposit and from the underlying aluminum substrate; the porous oxide above the deposits does not play any part in the colour generation since it has a thickness greater than 3 $\mu$ and is thus "optically thick". Moreover, the pores above the deposits are typically filled and sealed by the well-known boiling process to enhance the chemical and mechanical resistance of the anodic film (see the Wernick & Pinner monograph mentioned above).

Despite the improved colours produced by the second generation structures disclosed in our U.S. patent mentioned above, there is still a need for optical interference structures having extended capabilities for new applications.

OBJECTS OF THE INVENTION

Accordingly, an object of the present invention is to provide optical interference structures which have one or more of the following advantages, namely an extended range of available colours, higher saturation of colours, extended optical capabilities and less expensive manufacturing techniques compared with the vacuum deposition techniques normally used for conventional multi-layer stacks.

SUMMARY OF THE INVENTION

The present invention is based in part on our finding that the range and saturation of the optical interference colours in porous structures of the kind we have previously developed can be considerably enhanced, and additional effects such as dichroism become readily accessible, by reducing the thickness of the porous section of the film above the deposits to the optically thin range, i.e. less than 3$\mu$. This is because electromagnetic radiation reflected from the outer surface of the porous film (or a semi-transparent deposit that may be positioned at that surface) interferes with light reflected from the deposits and/or the aluminum substrate, and this "surface reflection" makes an additional substantial contribution to the overall interference effects without increasing scattering and absorption effects. Moreover, the porous part of the oxide layer now forms part of the colour generating structure because it is positioned between two surfaces which contribute to the interference effects, and the porosity can be exploited to impart useful additional properties to the structure.

Thus, according to one aspect of the invention, there is provided an optical interference structure which comprises: a reflective substrate, a porous transparent dielectric film on said reflective substrate, said film having an outer surface opposite to said reflective substrate; and at least one semi-transparent reflective layer supported by said porous dielectric film; said structure having at least two reflective surfaces separated by an optically thin porous layer of said dielectric film, one of said surfaces being present at said outer surface of said film.

According to another aspect of the invention there is provided an optical interference structure which comprises: a reflective substrate; a porous transparent dielectric film on said reflective substrate; and at least two semi-transparent reflective layers supported by said porous dielectric film with the pores thereof; said at least two semi-transparent reflective layers being separated from each other and from said substrate by optically thin strata of said dielectric film.

An important characteristic of the structure of the invention is that a porous part of the dielectric film is positioned between at least two reflective surfaces which contribute significantly to the overall interference effects, with the pores spanning the thickness of the dielectric between these at least two surfaces.

In preferred forms of the invention, reflections from the outer surface of the film (optionally coated with a semi-transparent metal layer) contribute to the interference effects, and the dielectric film is optically thin having a thickness of less than 3$\mu$.

The porous dielectric film generally has a porosity (percentage of open pore space) of at least 5% by volume, more usually at least 10% by volume and preferably at least 15% by volume. The maximum porosity is not strictly defined but is usually less than 60% by volume (determined to be the point at which the film has insufficient cohesive strength and falls apart) and normally less than 50% by volume.

The reflective substrate is preferably a metal and is normally aluminum or an anodizable aluminum alloy. However, when metals other than aluminum are used, so-called valve metals such as tantalum are normally avoided because these metals exhibit intense colours when covered by optically thin transparent layers due to both interference and absorption effects and these colours may dominate those produced by the semi-transparent reflective layers of the present invention. The metal substrate may be an article of any desired shape, size, thickness, etc. for example, it may be a finished article of any kind, a plate, a sheet, a thin foil, a film of Al deposited, for example, by sputtering or evaporation onto glass or plastic substrates, etc.

Each semi-transparent reflective layer is normally a porous or discontinuous metal layer formed, for example, by electrodepositing an inorganic pigment, vacuum sputtering or electroless or immersion plating, as will be explained more fully later.

Various terms of art are used in this specification and these are briefly explained in the following.

By the term "optically thin" used throughout this specification, we mean that a spacing between two reflective surfaces is so thin that significant interference (i.e. leading to colour changes observable by eye) takes place between light reflected from these surfaces. Conversely, "optically thick" means that the spacing is too large for significant interference to take place. Optically thin layers have a thickness of less than 3$\mu$ and generally have a thickness in the range of 0.01 to 1$\mu$.

By the term "inorganic pigment" as used herein we mean a metal or metal compound that results from an electrolytic or electroless chemical deposition procedure, e.g. as disclosed in our British patent mentioned above.

By the term "weakened stratum" we mean a zone in a porous anodic film below the outer surface and generally parallel thereto (or following similar contours if the surface is not flat) which is weaker than the remainder of the anodic film to the extent that the film can be controllably and reliably fractured and separated in this zone.

By the term "reflective surface" we mean a surface which reflects sufficient light to make a significant contribution to the desired interference effect even though such surface may also transmit a significant proportion of the incident light.

By the term "semi-transparent" as applied to a layer, we mean that sufficient light may pass through the layer to allow reflections from lower layers of sufficient intensity to produce noticeable interference effects.

By the term "dichroism" we mean an interference colour which varies in line with viewing angle.

Use is made throughout the disclosure of such terms as "upper", "lower", "lower regions" etc. which apply to the structures when orientated with the reflective substrate below the anodic film. Such terms are used for the sake of convenience of description but should not be taken to imply that the device can only be used in that particular orientation.

DESCRIPTION OF THE DRAWINGS

FIGS. 5(a)–(i) are schematic cross-sections showing other structures according to the present invention.

FIG. 6 is a perspective view of a microwaveable food container bearing a doneness indicator according to the present invention;

FIG. 7 shows an alternative structure used for the preparation of dichroic ink;

FIG. 9 is a graph showing the change in reflectance spectrum produced upon impregnation of a structure produced in the Examples.

DETAILED DESCRIPTION OF THE PREFERRED EMBODIMENTS

Figure 1:
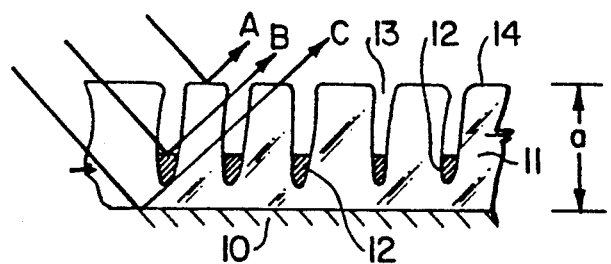
FIG. 1 is a cross-section illustrating a basic structure according to a first preferred embodiment of the invention.
Figure 2:
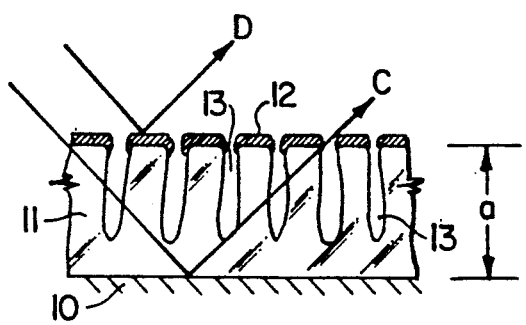
FIG. 2 is a cross-section similar to FIG. 1 illustrating a basic structure according to a second preferred embodiment of the invention.
Figure 3:
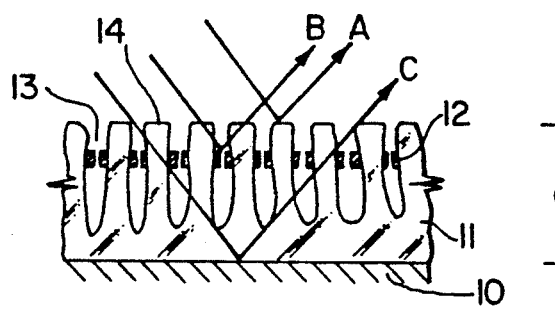
FIG. 3 is a cross-section similar to FIG. 1 illustrating a basic structure according to a third preferred embodiment of the invention.

FIGS. 1, 2 and 3 show basic forms of the structures of the present invention. In FIG. 1, a porous transparent dielectric film 11 is formed on a reflective metal substrate 10. The film 11 has inorganic pigment (metal) deposits 12 in the pores 13 and the total thickness "a" of the film is preferably 1μ or less. Light incident on the structure is partially reflected from the outer surface 14 of the film (ray A), from the outer ends of the metal deposits 12 (ray B) and from the underlying metal 10 (ray C). Because of the optical thinness of the entire porous film, the reflective surfaces are all separated from each other by distances such that all of the reflected rays interfere strongly to produce interference colours. In particular, the interference of rays A and B make a significant contribution to the generated colour in contrast to the structures of our British and US patents mentioned above. Moreover, the porous part of the film between the metal deposits 12 and the outer surface 14 is involved in the colour generation, i.e. its thickness and refractive index affect the generated colour, which yields the advantages described later.

In FIG. 2, thin metal deposits 12 are formed essentially on the surface 14 of the porous film, although they may extend down the pores. Together, the deposits 12 form a semi-transparent layer. The layer formed by the deposits 12 may be porous (as shown) so that the pore interiors remain accessible from the surface, or alternatively the upper parts of the pores may be blocked by the deposits 12 for the reason given later, although the deposits must remain semi-transparent. If the layer formed by the deposits 12 is porous, it may be either discontinuous (the deposits remain separate from each other) or continuous but penetrated by pores. In this structure, light is reflected strongly from the outer surfaces of the metal deposits (ray D) and the underlying metal substrate (ray C). Since the separation of these layers is again optically thin (the distance "a" being preferably 1μ or less), the rays interfere to generate a visible colour. As in the embodiment of FIG. 1, the porous part of the film 11 that lies between the reflective layers is active in the generation of the interference colours.

In the embodiment of FIG. 3, the deposits 12 are positioned at a level intermediate to the outer surface 14 of the film 11 and the bottoms of the pores 13. In this case, interference takes place between light reflected from the outer surface 14 of the film (ray A), the tops of the deposits 12 (ray B) and the surface of the substrate metal 10 (ray C). The separation of these various reflective surfaces is small enough for the interference to take place since the overall thickness "a" of the layer is preferably less than 1μ. Porous parts of the film 11 are positioned between each of the reflective surfaces, and so these porous structures take part in the generation of the interference colours.

In the embodiments of FIGS. 1, 2 and 3, the deposits 12 form a semi-transparent layer, the difference being that in FIGS. 1 and 3 the structures are oxide-metal-oxide-metal (OMOM) whereas in FIG. 2, the structure is metal-oxide-metal (MOM).

The features common to each of the basic structures of FIGS. 1, 2 and 3 are (1) interference takes place between light reflected from a plurality of layers separated by optically thin distances, one of the reflective layers being the outermost surface of the structure, and (2) a porous part of the film is present between at least two of the reflective surfaces mentioned in (1). The porosity of the film is significant for the following reasons.

First, as is well known in the art of optical coating, any porosity in a dielectric film reduces the effective refractive index of the film. It is also known that in multilayer optical stacks dichroic effects (i.e. change of colour with viewing angle) are enhanced as the average refractive index of the dielectric in the stack is decreased. Strongly dichroic structures are of interest for certain applications detailed below. Secondly, the fact that the dielectric layers in the present optical films consist of porous oxide means that the effective refractive index of these layers can be changed (increased) by replacing air in the pores with another transparent material. This makes it possible to produce colour shift devices, i.e. devices which change colour when materials are introduced into, or removed from, the pores. The change in refractive index (n) affects the generated colour because interference between light reflected from adjacent layers depends not on the physical spacing (d) between the layers, but on the optical spacing (n × d).

Figure 4:
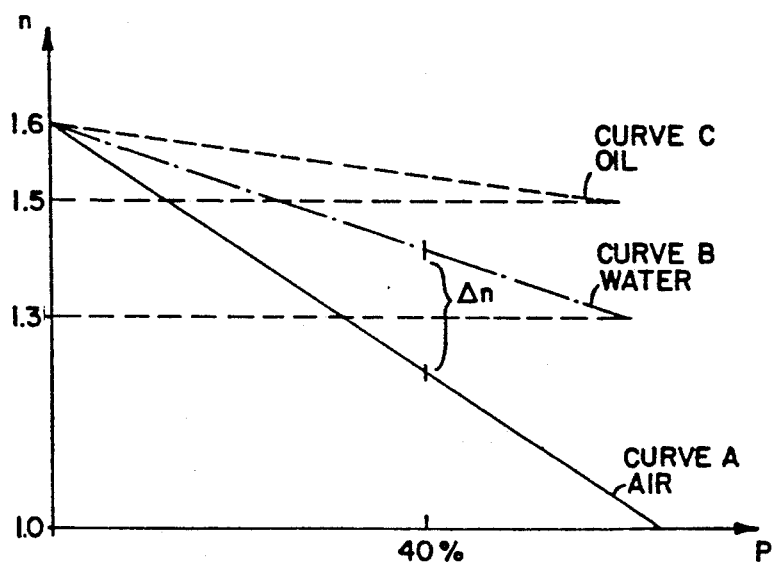
FIG. 4 is a graph showing refractive index (n) against porosity (p) of a dielectric layer when the pores are filled with air (n=1.0), water (n=1.3) or oil (n=1.5)

This effect is shown in the graph of FIG. 4 in which the effective refractive index of a porous anodic film (n=1.6 for dense aluminum oxide) is plotted against porosity. As the porosity of the film increases and more air replaces oxide material, the refractive index decreases from that of the dense oxide to that of air (n=1). This is shown by curve A. If the air in the pores is replaced by water, on the other hand, a less steep curve is obtained as the final refractive index approaches that of water (n=1.3). Thus, for any given porosity (e.g. 40%), if water displaces air in the pores, the effective refractive index of the porous anodic film changes by ▲ n, and this changes the wavelength at which constructive reinforcement takes place, and consequently changes the observed colour.

The structure of FIG. 1 can be prepared most conveniently by porous anodizing a metal substrate 10 made of aluminum or an anodizable aluminum alloy. This is done using an electrolyte containing an acid (phosphoric acid, sulfuric acid, oxalic acid, etc.) for a time suitable to grow a porous anodic film 11 of the desired (optically thin) thickness. A metal pigment 12 may then be deposited in the bottom parts of the pores by carrying out electrolytic deposition for a suitably short period of time (10–200 seconds). The required techniques are disclosed in detail in our British and U.S. patents mentioned above. The pigment deposited in the pores is preferably one of the transition metals capable of being electrodeposited, e.g. nickel, cobalt, although other standard depositable metals such as tin, copper, iron, silver and others will work.

The structure of FIG. 2 can be formed, for example, simply by porous anodizing the substrate 10 followed by sputtering or otherwise depositing the semi-transparent metal layer 12 on the resulting porous anodized film 11. The metal layer can also be deposited chemically as follows: the substrate 10 is first "flash" anodized to form a thin non-conductive oxide layer, a semi-transparent metal layer is deposited on the thin layer by electroless plating and then porous anodization is carried out to grow a porous film 11 below the semi-transparent metal layer to the desired thickness. It is quite surprising that porous anodization can be carried out after the formation of a semi-transparent metal layer by electroless plating and this may be due to the fact that the metal layer retains some porosity. Electroless plating is carried out without the application of potential and metal deposition is initiated at various catalytic sites on the surface of the oxide film. The initial deposits (metal particles) grow until they merge with each other. Even after such merging takes place, however, the metal particles seem to remain discrete for a further period of plating and gaps between the discrete particles appear to allow anodization to take place so that a porous anodic film can be grown below the metal layer. The semi-transparent layer produced by this method is not usually entirely restricted to the outer surface 14 of the anodic film because the initial flash anodization often results in the formation of short or incipient pores and the electroless plating deposits metal in these short pores as well as on the outer surface. As the pores are lengthened by the further anodization the metal deposits remain in the tops of the pores. Only if the initial flash anodization is extremely short is the semi-transparent layer confined to the outer surface.

The structure of FIG. 3 can be formed most conveniently by first producing a structure according to FIG. 1 and then continuing porous anodization to extend the porous film below the deposits 12. This is not a straightforward procedure, however, because the usual electrodeposited metals 12 tend to dissolve or disperse in the strongly acidic electrolytes required for further porous anodization. We have found that this problem can be overcome and re-anodization in a strong and aggressive electrolyte, e.g. phosphoric acid, can be carried out with virtually no dissolution and very little, if any, dispersion of the previously electro-deposited metal layer. This can be accomplished by employing one of three alternative methods, as detailed below.

The first method involves electro-depositing a noble metal seed within the pores of the initial structure. Noble metals (e.g. Pd) are resistant to acid electrolytes used for the subsequent porous anodization but they tend to spread up the sides of the pores as deposition proceeds and this is disadvantageous because the deposits are desirably to have uniform heights and flat outer surfaces to give uniform reflections. Therefore, the electrodeposition is carried out just long enough to deposit a small amount of the noble metal. After the subsequent anodization step to lengthen the pores 13, the structure is subjected to electroless plating. The noble metal deposit acts as a seed for the deposition of the additional metal and the deposit is thus enlarged until it reaches an adequate size to produce sufficient reflection.

The second method is similar to the first, except that the noble metal seed is enlarged by electroless plating before the anodization to lengthen the pores. This is possible because the metals deposited by electroless plating (e.g. Ni) are resistant to the strong acids used in the electrolytes required for porous anodization.

The third method is the most preferred. This involves first making a structure equivalent to that of FIG. 1 using the normal (so called ANOLOK) metals for the electrodeposits 12. These deposits are then protected by providing them with an acid-resistant coating of a noble metal such as Pd or Au by an immersion plating technique (e.g. using a $PdCl_2$ or $AuCl_2$ solution). Immersion plating is somewhat similar to electroless plating but will not continue indefinitely once it has been initiated, thus plating will cease once all the surface sites of the host metal are occupied). Then further anodization can be carried out to lengthen the pores 13 without the deposits 12 being attacked to any substantial extent. This method is the most preferred because it relies on the electrodeposition of normal electrocolouring metals and this produces a very regular and uniform semi-transparent layer in the anodic film.

By exercising careful control during each step of the production methods mentioned above for the formation of the basic structures of FIGS. 1, 2 and 3, layers of the required thickness, porosity and transparency can be formed. In particular, the pore density and diameter are determined during the anodization step, and are controlled primarily by the anodizing voltage, type of electrolyte and its temperature. For example, sulfuric acid at room temperature tends to produce narrow but closely spaced pores, while on the other hand, phosphoric acid tends to produce larger and more widely spaced pores. Other acids or mixtures of acids may also be suitable, as will be apparent to persons skilled in the art.

If desired, the anodization can be started off in conditions which produce high pore density until a porous film starts to form and then the conditions can be changed to promote the growth of wide pores. This results in the formation of pores having narrow top sections and wide bottom sections (referred to as "bottle-neck" pores). The pigment is then deposited into the wide bottom sections of the pores resulting in a shallower more even deposit. Bottle-neck pores can be produced, for example, by commencing the anodization in an electrolyte containing sulfuric acid and then switching to an electrolyte containing phosphoric acid. This is useful potentially in production since sulfuric acid anodization can be carried out at about ten times the rate of phosphoric acid anodization.

The structures of the present invention are prepared most conveniently by the anodization techniques mentioned above applied to aluminum or its alloys. Porous anodic films are realized on other anodizable metals such as Ti and Zr which might be suitable, for example, for the structure of FIG. 2. These are not preferred however because the refractive index of such anodic films is typically close to 2.0 i.e. too high for significant dichroic effects and the pores do not form a regular array spanning the anodic film thickness so that only a small fraction of the porosity is accessible for incorporation of pigments or other material. Moreover, such films are already strongly coloured by an absorption and interference effect peculiar to these oxide-metal combinations which dominate any interference effects arising from additional metal deposits of the type disclosed here.

It is also possible to use substrate metals that cannot be porous anodized. For example, porous dielectric layers can be can be formed on substrates by sol-gel techniques of the type disclosed in the article entitled "Porous Fluoride Anti-reflective Coatings" by I. M. Thomas, Applied Optics 27, 3356 (1988), the disclosure of which is incorporated herein by reference. This technique can be used, for example, to produce the structure of FIG. 2 by first forming the porous dielectric layer 11 and then sputtering the semi-transparent metal layer 12 on the surface. Other techniques may also be possible, for example, devices equivalent to the structures of FIGS. 1, 2 and 3 but having non-porous layers may be made by conventional sputtering techniques, and then pores may be formed in the layers by subjecting the material for example to neutron bombardment in a nuclear reactor or to high voltage electrical discharge.

In any of the structures of the present invention, the metal layer 10 may if desired be very thin and may itself be supported on a material of a different kind, e. g. a plastic, ceramic or metal. If so, and if the structure is being formed by anodization, then the aluminum layer 10 should, of course, be thick enough to allow conversion to the oxide layer of desired thickness and to leave a reflective surface below the oxide layer 11. It is particularly desirable for some applications to make layer 10 a thin foil of aluminum or aluminum alloy. The resulting device can then be produced as a flexible tape and, if necessary, provided with an adhesive layer for attachment to any article or product as a surface coating.

The surface of the layer 10, prior to the formation of the dielectric film 11, may be treated to produce desirable effects. For example, an aluminum surface may be etched or conversely brightened to modify reflection.

Although the basic structures of the invention shown in FIGS. 1, 2 and 3 are extremely useful for various applications as described below, it has been found that modifications can be made to the basic structures to produce a greater variety of useful devices. For example, it is possible to combine the features of one of the structures with those of another and/or to produce modifications in which one or more of the features of the basic structures are repeated. For example, the bottom pore deposits of FIG. 1 can be introduced by electrodeposition into the structures of FIGS. 2 and 3 to provide an additional semi-transparent metal layer. Similarly, the metal surface coating of FIG. 2 can be provided on the structures of FIGS. 1 and 3. As a further example, the deposition and pore lengthening steps carried out to produce the structure of Fig 3 can be repeated (once or several times) to produce several buried semi-transparent layers at different heights in the film.

Furthermore, any of the structures of the present invention can be given the ability to effect an irreversible colour change (e.g. from one interference colour to another, from an interference colour to the colour of the underlying substrate material). This is done by incorporating a weakened stratum into the porous film so that part or all of the film can be detached from the remaining structure along this stratum. If the stratum is suitably located, the interference colour generated by the structure can be created, changed or destroyed when the upper part of the film is detached.

Such a weakened stratum can be introduced into the porous films of the present disclosure by a pore branching technique carried out as a part of the film formation. The pore branching technique is similar to the procedure disclosed in our European patent application number 0 178 831 published on Apr. 23, 1986 (the disclosure of which is incorporated herein by reference) and involves a variation in the anodization voltage in a continuous or stepwise manner during the porous anodization step. This causes each pore formed during the normal anodization step to branch out at its bottom part to form numerous smaller pores that collectively weaken the film. For example, the anodization voltage can be reduced from the normal anodization voltage (typically in the range of 3 to 200 V, but more usually 5 to 100 volts) to 0 volts in 0.5 volt increments. In our European patent mentioned above, the pore branching technique is carried out as a final step of the film formation so that the porous film can be completely detached from the metal substrate. In the present invention, we have surprisingly found that it is possible to continue normal porous anodization after the pore-branching step in order to locate the weakened stratum at virtually any desired position in the porous film between the metal substrate and the outer film surface. This can be done without causing the film to separate prematurely from the substrate or compromising the separation capability. This is surprising because porous anodization is a competition between the dissolution of the film by the acidic electrolyte and the growth of the film by the electrolysis. Once a weakened stratum comprising numerous small pores has been created, it would be expected that further porous anodization at normal voltages (e g. 5-100 volts or more) would either cause the film to separate at the weakened stratum or cause an adverse change in the structure of the weakened stratum. This does not take place, and pores connected to the film surface passing through the weakened area continue to grow below the weakened stratum.

It has also surprisingly been found that electro-deposition can still be used to position a deposit at the bottoms of the pores even when the pore bottoms are separated from the surface of the anodic film by a weakened stratum, and that such deposition does not result in premature separation of the film. In this way, a porous anodic film containing a weakened stratum at an intermediate level can first be formed in the manner mentioned above and then a metal deposit can be position at the pore bottoms.

Finally, it has been found that the weakened stratum can be introduced during either the first or the second anodization step mentioned above in connection with the method of forming the structure of FIG. 3. This means that a weakened stratum can be positioned either above or beneath the metal deposits 12 of FIG. 3 within the porous film 11.

The number of different structures which can be produced by combining various ones of the techniques mentioned above in different sequences is large and some examples are shown in FIG. 5 and are discussed below.

In FIG. 5(a), the structures of FIGS. 1 and 2 have been combined to provide a surface deposit 12b and a further deposit 12a at the bottom of the pores 13 to form a metal-oxide-metal-oxide-metal (MOMOM) structure. The deposit 12b enhances the surface reflection and the deposit 12a provides an additional reflective surface so that the interference effects are quite strong and complex (dichroism can be enhanced by increasing the number of reflective layers). The filing of the pore 13 with a liquid or solid changes the average refractive index of the film 11 and thus causes a change in the generated colour. This structure can be formed be preparing a structure as shown in FIG. 2 and then electrodepositing a metal 12a at the pore bottom in the usual way.

The structure of FIG. 5(b) combines the features of FIGS. 2 and 3 to form a metal-oxide-metal-oxide-metal (MOMOM) structure. This can be formed by preparing the structure of FIG. 3 and depositing metal on the surface.

The structure of FIG. 5(c) combines the features of all of the basic structures of FIGS. 1, 2 and 3 to form a metal-oxide-metal-oxide-metal-oxide-metal (MOMOMOM) structure. This can be prepared by forming the structure of FIG. 3, electrodepositing a metal in the pores and then depositing a metal on the surface.

The introduction of a weakened stratum into the structures produces further diversity as will be seen from FIGS. 5(d) to 5(l).

In FIG. 5(d), a weakened stratum 15 is introduced into a structure that is otherwise the same as FIG. 1. Separation of the film along the stratum 15 eliminates the interference effects caused by reflections from surface 14 and introduces new interference effects resulting from reflections from the new surface of the residual film (unless the weakened stratum coincides with the tops of the deposits 12). The generated colour thus undergoes a change of hue.

The structure of FIG. 5(e) is the basic structure of FIG. 2 having a weakened stratum at intermediate level in the porous film or at the bottom of the pores.

FIG. 5(f) is the basic structure of FIG. 3 having a weakened stratum 15 at the bottom of the pores 13. Separation of the film along the weakened stratum causes the colour generated by the original colour to be completely eliminated so that the remaining structure merely has a metallic appearance.

FIG. 5(g) is the same as FIG. 5(f) except that the weakened stratum 15 is positioned above the metal deposits 12. The effect of separation of the film 11 along the stratum 15 is similar to that in FIG. 5(d). However, the growth of the film 11 and pore 13 below the deposit 12 gives rise to different interference effects because of the different separation of the reflective layers.

In FIG. 5(h), there are two deposits 12a and 12b in the pore 13. Deposit 12a is positioned at the bottom of the pore and deposit 12b is at an intermediate position. A weakened stratum 15 is located above both deposits. Separation of the film along the stratum has an effect similar to that of FIG. 5(d), but by having two deposits instead of one, more reflective surfaces are provided and the interference effects are thus more complicated.

FIG. 5(i) is similar to FIG. 5(h) except that the weakened stratum 15 is positioned between the two deposits. Separation of the film along the stratum eliminates two reflective surfaces (the surface 14 of the original film and the surface of the deposit 12b) so the interference effect is radically changed.

The structure of FIG. 5(j) is the same as that of FIG. 5(b) except that a weakened stratum 15 is additionally provided at the bottoms of the pores 13, allowing for film separation to produce a colour change.

FIG. 5(k) is the same as FIG. 5(a) except that a weakened stratum is positioned above the lower deposits 12a. The structure of FIG. 5(l) is the same as FIG. 5(b) except that a weakened stratum 15 is positioned at a level in the film between the two deposits 12a and 12b.

Further combinations in addition to those shown are also possible.

Incidentally, when the dielectric film contains more than one semi-reflective layer buried in the dielectric film (e.g. as in FIG. 5(h) or 5(i), the reflection from the outermost one of these layers may replace the reflection from the outer surface of the dielectric film, so the layer of dielectric film above this outermost layer can, if desired, be optically thick. The semi-transparent reflective layers are preferably separated from each other and from the reflective substrate by optically thin strata of the dielectric film.

The various structures falling within the scope of the invention can be used for applications which fall into three basic groups. The first group does not make use of any colour shift or colour change, but relies merely on the intense and dichroic colours which can be generated by the structures of the invention. The second group relies on the ability of certain structures to exhibit a colour shift when one material in the pores is replaced by another. The third group relies on the ability of the structures having a weakened stratum to undergo a colour change when film separation takes place. The applications falling into these various groups are explained in more detail below.

The MOM structure of FIG. 2 is especially suited for the first group of applications mentioned because of the strong dichroism that is exhibited. In this group of applications, colour shift effects caused by the replacement of one material in the pores by another are not desired. The pores are therefore preferably sealed at their upper ends to prevent the entry of moisture or other materials into the pores by the pores. This can be done in various ways, but complete filling of the pores by the usual sealing process (e.g. as disclosed in the Wernick and Pinner monograph above)should normally be avoided because this increases the average refractive index of the film and thus reduces the desired dichroism. Sealing of the pores can be achieved, for example, by laminating a transparent film (e.g. of plastic or lacquer) over the outer surface of the structure, or in those cases where metal deposits are formed on the outer layer of the porous film, depositing sufficient metal (e.g. by sputtering) to close the outer ends of the pores while still keeping the layer thin enough for the metal layer to be semi-transparent. These techniques (particularly the lamination) also have the effect of protecting the structures against mechanical and chemical attack, thus making the structures more desirable.

Structures of this kind which are dichroic can be used for a variety of purposes. For example, dichroic structures can be incorporated into banknotes, tickets or other important documents to protect them against counterfeiting. Sophisticated modern photocopiers can duplicate intricate coloured patterns, but cannot duplicate dichroism. The dichroic effect thus shows that the article is the original. Coloured and/or dichroic structures can also be used merely for decorative purposes, e.g. to decorate novelty items, interior surfaces and jewellery.

The second group of applications makes use of the ability of the structures having open pores to exhibit a colour shift usually for the purpose of indicating the presence of certain materials or conditions. Both the MOM and OMOM types of structures of FIGS. 2 and 3 are best suited for this type of application, although the other structures may alternatively be used if desired. In these applications, the pores should be open to the exterior, at least when the colour shift is desired. Colour shifts can be produced by (1) allowing a substance to penetrate into the porous film from the exterior to produce a change of colour, (2) impregnating a substance into the porous film and allowing it to volatilize (or otherwise remove itself) under certain conditions to produce a colour change, or (3) a combination of (1) and (2) so that a first colour changes to a second colour and then back to the first colour.

Examples of devices which rely on (1) above are freeze/thaw indicators, e.g. for warning that frozen foods have been subjected to freeze/thaw cycles. Such indicators must be inexpensive and the indication must be highly visible and reliable, which can be achieved by the structures of the present invention. In the presence of ice, the pores remain free and the original colour of the device is exhibited. If the ice melts, water enters the pores and a colour change is observed. The second colour remains even if the temperature falls below the freezing point again because the water in the pores freezes in place and is not easily volatilized from the pores.

Another example of devices which rely on (1) above are inkless finger print recording devices. In this case, oils from the skin enter the pores when a finger is pressed against the device and a colour change is observed. However, the change takes place only in those areas where the contact with the skin is made and it is found that the minute ridges of the skin produce colour changes whereas the minute grooves between the ridges do not; hence a finger print can be recorded. The oil from the skin is not very volatile and so the print remains visible for some time, but the recorded print can be made more permanent by sealing a plastic membrane over the outer surface once the print has been taken.

Examples of devices which rely on (2) above are time-temperature indicators. These devices have a material (liquid or solid) in the pores which is relatively non-volatile at room temperature but which has increased volatility at temperatures above a certain threshold temperature. The original colour of the device gradually changes to a second colour when the device is exposed to temperatures above the threshold as the material gradually evaporates from the pores. Higher temperatures promote a higher rate of evaporation and thus a faster colour change. Such sensors can be used to indicate when foods have been cooked adequately.

Devices intended for the same purpose (i.e. to indicate when foods are cooked), but which work on different principles, have previously been disclosed in our European patent application serial number 0 272 089 published on Jun. 22, 1988, the disclosure of which is incorporated herein by reference, specifically for use in association with microwaveable food containers. In this publication, it is shown that the so-called "doneness" indicators can be mounted on external surfaces of microwaveable metal food containers and by properly choosing the dimensions of the containers and the disposition of the indicators, the indicators can be shielded from temperature-elevating irradiation by microwave energy. This procedure is preferably also adopted when the time-temperature indicators of the present invention are used as doneness indicators for microwaveable food containers, in order to avoid false indications resulting from direct heating of the volatilizable material in the pores.

A suitable arrangement is shown in FIGS. 6 and 7. FIG. 6 shows a microwaveable container 30 which includes a stiff metal (e.g. aluminum) foil base member 32 having a bottom 34 and side walls 36 co-operatively defining an upwardly open chamber within which a body 31 of foodstuffs is disposed. The container has a lid 38 of microwave-transmissive dielectric material, such as paper or plastic, closing the top of the chamber. Such a container may be provided as a disposable package for frozen food or the like.

The container lid has upper and lower major surfaces 38a and 38b respectively facing away from and toward the contained body of foodstuff. The lower lid surface 38b is spaced above the surface of the foodstuff by a gap 40 and a plurality of spaced apart metal (e.g. aluminum) foil islands 42 are bonded to the upper lid surface 38a. The array of metal islands 42 and the gap 40 cooperatively enhance coupling of microwave energy into the interior of the container, i.e. when the container holding the foodstuff body is disposed in a microwave oven and irradiated therein with microwave energy for heating the foodstuff.

Each of the metal islands 22 is a thin foil electrically conductive metal element having first and second opposed extended surfaces (i.e. opposed major surfaces) 42a and 42b. The surface 42b faces downwards towards the foodstuff and is bonded to the lid surface 38a, while surface 42a faces upwards so as to be visible through the window of the microwave oven.

One of the islands 42 (such island being designated 42') bears on its upper surface a doneness indicator 44 according to the present invention. This is preferably a structure according to FIG. 1 having a material filling the pores 13. The material should be (a) compatible with food products, (b) must evaporate at a suitable temperature (e.g. 500°-300° C.) and after a suitable time (e.g. a number of minutes at a predetermined temperature) and (c) must be shielded from the microwaves. Long chain olefins are suitable for this purpose.

The indicator 44 may be adhered to the metal island 42', or the metal island 42' may form the metal substrate 10 of the structure in FIGS. 1-3.

Although in this arrangement the indicator 44 is on the outside of the container 30, it nevertheless is shielded from the microwave energy for the reasons explained in our European patent application 0161739, the disclosure of which is incorporated herein by reference. The indicator receives heat from the body 31 by conduction or radiation as the body is heated by the microwaves, and when the foodstuff has reached a certain temperature for a certain time, all of the material evaporates from the pores and the indicator 44 changes colour to indicate that cooking is complete.

By incorporating materials of different volatility into the pores of different areas of the device, more complex temperature sensors can be produced for microwave containers or for other purposes. For example, a material which volatilizes at temperatures above 100° C. could be impregnated into one area and a material which volatilizes at 200° C. could be impregnated into another area. A colour change in the first area but not in the second would indicate that the device had been exposed to a temperature between 100° and 200° C. for a certain length of time. By increasing the number of areas and different materials, an "irreversible thermometer" can be formed to indicate a temperature maximum to which the device has been exposed over a period of time.

Examples of devices which rely on (3) above include reversible moisture sensors. Such devices can be used to indicate the humidity of the air, when plants need to be watered and for many other purposes. The presence of moisture is indicated directly by a colour change when water enters the pores. If the conditions then become suitably dry, the water eventually evaporates from the pores and the initial colour is restored. When desired, it is possible to incorporate latent or non-latent messages or patterns into colour shift structures according to the present invention (i.e. structures suitable for the second group of applications) by the following procedures. The pores in certain areas of the film may be filled with a non-volatile or settable material (e.g. a lacquer). The material enters the pores in those areas and produces a permanent colour change. Pores in other areas may remain empty (in which case the colour of the filled areas contrasts with the colour of the unfilled areas) or may be temporarily filled with a volatile material. If the volatile material and the non-volatile material have a similar refractive index, the device will have a uniform colour when all the pores are filled and the message, pattern or random design will not be visible. Upon exposure of the device to conditions which promote evaporation of the volatile material, a colour change occurs in the areas filled with the volatile material which then contrast with the non-volatile material-filled areas of the film. Hence, the message, pattern or random design is "latent", i.e. initially invisible but developable under certain conditions. For example, if this procedure is used during the manufacture of time-temperature sensors, hidden messages may be incorporated into the structures which are revealed when the device has been exposed to suitable temperatures for suitable times. Thus the word "COOKED or the like may be made to appear when such devices are used on microwaveable food containers.

Devices intended for the third group of applications mentioned above are colour change devices which rely on the presence of a weakened stratum in the porous films so that an upper part of the film can be detached and a substantially permanent colour change thereby produced. Such devices are especially useful in security applications where the colour change can indicate tampering and the like.

As previously explained, colour change devices can be prepared from any of the basic structures of FIGS. 1 to 3, 5(a), 5(b) or 5(c) by suitably positioning a weakened stratum with the porous films so that there is either a change from one colour to another when the film is separated, or so that the initial interference colour is completely destroyed when separation takes place. A further option is to start with a structure having a porous film that is too thick for reflections from the outer surface to interfere with other reflections from within the film but to position the weakened stratum in such a way that, after separation of the film, the residual structure is in accordance with the present invention so that a strong interference colour is then generated. Examples of the structures which can be used as colour change devices are shown in FIGS. 5(d) to 5(l).

In the case of the structure shown in FIG. 5(d), for example, three colour change cases can be expressed on theoretical grounds by stating that the anodic film should preferably satisfy the following conditions:

$$\text{when } x \leq d \text{ then } o \leq y \leq (x - \Delta d) \quad (1)$$

and $$\text{when } x > d \text{ then } o < y \leq d \quad (2)$$

wherein
  x is the thickness of the intact anodic film above the upper surfaces of the deposits;
  y is the thickness of the residual anodic film above the upper surfaces of the deposits;
  d is the maximum thickness of the anodic film above the upper surfaces of the deposits capable of exhibiting a noticeable colour due to interference between light reflected from the upper surfaces of the deposits and light reflected from the upper surface of the anodic film; and
  $\Delta d$ is the minimum change in thickness of the anodic film capable of exhibiting a noticeable colour change when $x < d$.

As noted above, the value of d is usually around $1\mu$, and is never greater than about $3\mu$, and represents the boundary between optically thin and optically thick films. The value of $\Delta d$ depends on which colours are generated; for example it may be 40Å for blue but 200Å for green due to the differing sensitivity of the eye in different colour ranges.

In colour change devices of this kind, the weakened stratum should preferably so weaken the porous film that detachment of the upper film part can be effected by hand (although stronger films detachable only by machine are conceivable). In the simplest case, the upper film part can be detached merely by scratching or abrading the upper surface of the structure to cause flaking of the upper film part. However, if it is desired to remove the upper film part more easily and reliably, a transparent sheet can be attached to the porous film so that detachment of the sheet causes simultaneous detachment of the upper film part. If convenient, part of the sheet may be left unattached near an edge in order to form a graspable tab to facilitate peeling of the sheet (and upper film part) from the remainder of the structure. Structures of this kind are particularly suitable for use in tamper-evident seals which prevent a container of some kind from being opened without detachment of the sheet from the underlying structure. When detachment takes place, a colour change is produced signalling that the device has been opened and the original colour cannot be restored simply by pressing or adhering the layers back together because fracture of the weakened stratum precludes restoration of intimate contact and intervening air or adhesive molecules prevent the original interference conditions from being regenerated. Similarly, attempts to puncture or cut structures of this kind result in detachment of the upper film part in the immediate area of the pierced part, thus creating a colour change which highlights the affected area.

Latent or non-latent messages or patterns can also be incorporated into structures having a weakened stratum. This is done by reinforcing the pores in some areas of the device while leaving the pores in other areas unchanged. As a result, the upper film part can be detached only in the non-reinforced areas. The result of peeling is a structure having different areas of contrasting colours and these contrasting areas can be configured into messages or patterns. The desired reinforcement can be achieved by causing certain materials to enter the pores in particular areas of the film. The materials should be sufficiently free flowing to penetrate the pores to the level of the weakened stratum and should exert an adhesive or stiffening effect. Many common glues, adhesives or lacquers form adequate reinforcing agents, e.g. pressure-sensitive adhesives, UV and heat-curable lacquers, epoxy resins and hardeners. To produce the desired design, a silk screening or flexographic printing technique for example, can be used to coat those areas of the film where no detachment is required, prior to applying the overlying transparent sheet. If the design is to be undetectable prior to use, the layer of reinforcing material applied to the film must be extremely thin or any residue must be removed from the surface after sufficient material has penetrated into the pores, otherwise it may form an observable area.

The invention is described in further detail with reference to the following Examples which are provided for the purpose of illustration only.

COLOR CHANGE FOILS

According to Examples 1 and 2, structures consisting of optically thin porous oxides on aluminum were prepared. These oxides contained a transparent nickel layer at the lower most region of the pores and were structurally weakened somewhere above the nickel and below the outer oxide surface, according to FIG. 5(d). Several peelable colored finishes were produced on aluminum foil. These colors changed to completely different colors when the overlying oxide film was peeled off with a polymer top coat laminate. Following is an account of how they were made.

EXAMPLE 1

Seventy micron gauge aluminum alloy AA3003 foil was cut into sheets measuring 16 cm by 12¼ cm. These sheets were given a short cold caustic etch with subsequent rinse to clean.

Each sheet was then 15 V DC anodized in 165 g/L $H_2SO_4$ at 22° C. for a period of time denoted $T_{(1)}$, then rinsed. The material was subsequently re-immersed in 120 g/L $H_3PO_4$ at 30° C. A voltage of 15 V DC was applied for a period of 5 seconds and then dropped to 14.5 volts. This voltage hold and drop sequence was repeated until the voltage reached 0.5 volts where the voltage was held for a period of time denoted $T_{(2)}$, followed by a holding time of equal duration at 0 volts. Subsequently, with the material remaining in the $H_3PO_4$, the voltage was swept up over 15 sec to reach 15 V DC and then held for a period of time denoted $T_{(d)}$; this completed the anodizing/pore weakening and continued anodizing stages of processing. Electro-deposition of metal was done using a standard nickel ANOLOK (TRADE MARK) electrolyte and procedure. The peak AC voltage was 20 volts and the duration at peak voltage was 20 seconds.

The original colour of the material was then noted. Transparent non-porous tape was applied and peeled off to expose the residual colour, once again noted. Table 1 below shows a series of results obtained using this processing technique.

TABLE 1

| $T_{(1)}$ (sec) | (2) (sec) | $T_{(3)}$ (sec) | Original Colour | Residual Colour |
|---|---|---|---|---|
| 5 | 20 | 20 | dark blue | light blue |
| 20 | 20 | 20 | yellow-green | light blue |
| 25 | 20 | 20 | purple | light blue |
| 30 | 20 | 20 | violet | light blue |
| 50 | 20 | 20 | emerald | light blue |
| 10 | 4 | 100 | yellow-green | red-orange |
| 25 | 3 | 100 | purple | purple-red |
| 30 | 3 | 100 | violet | orange-red |
| 35 | 3 | 100 | emerald | orange-red |
| 30 | 4 | 90 | violet | orange-yellow |

Figure 8:
FIGS. 8 and 10 are transmission electron microscope photomicrographs showing a cross-section of a structure produced in the Examples.

FIG. 8 is a photomicrograph showing the cross-section of a structure remaining after the peeling of the tape showing the substrate 10, deposits 12 and porous dielectric film 11.

EXAMPLE 2

In each of the following cases, the substrate material was 70 micron aluminum foil of alloy AA3003. Anodizing was carried out in 120 g/l phosphoric acid at 30° C. with slight agitation. After anodization and following a double immersion rinse, electro-deposition was carried out in a standard nickel ANOLOK solution for a duraction of forth seconds. After air drying, the foil was heat seal laminated to a polyethylene backed polyester sheet. The plastic sheet was then peeled to reveal the colour change noted below.

$T_{(1)}$ refers to the duraction of anodizing at 15 volts d-c which was followed by a voltage reduction processing segment consisting of 0.5 volt decrements every 5 seconds to a final voltage V. $T_{(2)}$ @ V refers to the soak time in the electrolyte at the minimum voltage reached. Finally, $T_{(3)}$ refers to the duration of the secondary anodizing stage at 15 volts d-c which followed the soak period.

| $T_{(1)}$ (sec) | $T_{(2)}$ @ V (sec) | $T_{(3)}$ (sec) | ORIGINAL COLOUR | RESIDUAL BACKGROUND COLOUR AFTER PEELING |
|---|---|---|---|---|
| 1 | 60 @ OV | 110 | Violet | Yellow |
| 30 | 60 @ OV | 110 | Blue | Yellow |
| 1 | 20 @ OV | 180 | Green | Blue |
| 120 | 0 @ OV | 180 | Violet | Blue |
| 1 | 0 @ 2.5 V | 430 | Violet | Green |

COLOR CHANGE FOILS WITH LATENT MESSAGES

According to Examples 3 and 4 devices were produced which, like Examples 1 and 2, comprise an optically thin porous oxide film on aluminum foil. These films contain a metal deposit and a coplanar weakened stratum according to FIG. 5(d). Localized areas of the film are re-strengthened so that when delamination occurs these areas remain intact. Thus, in some areas a color change occurs, in others it does not. The devices were prepared as follows.

EXAMPLE 3

Aluminum foil of alloy AA3003 and gauge 70 microns was anodized for a period of 30 seconds at 10 volts d-c in 120 g/L $H_3PO_4$ maintained at 30° C. The voltage was subsequently reduced in 0.5 volt steps at 5 second intervals until 0 volts was reached whereupon it was allowed to soak for 90 seconds. Immediately thereafter the voltage was swept to 15 volts d-c, maintained for 40 seconds, then cut to 0 volts. The foil was rinsed well, immersed in a standard cobalt ANOLOK TM solution, and subjected to a 30 second 16.5 volt peak ac electro-deposition treatment. The foil was then rinsed and dried. Messages in the form of words such as "void" were rubber-stamped on to the coloured surface using epoxy resin; then the foil was heat seal laminated with a non-porous plastic film.

The result was a violet laminate with hidden message that when peeled to delaminate, exposed the message in violet on a light blue background.

EXAMPLE 4

Aluminum foil of alloy AA3003 and gauge 70 microns was anodized for a period of 60 seconds at 15 volts d-c in 120 g/L $H_3PO_4$ maintained at 30° C. The voltage was subsequently reduced in 0.5 volt steps at 5 second intervals until 1 volt was reached whereupon the foil was allowed to soak for 5 seconds. Immediately thereafter the voltage was swept to 15 volts d-c, maintained for 190 seconds, then cut to 0 volts. The foil was rinsed well, immersed in a solution containing 1.5 g/L $AgNO_3$, 3 mL/L $H_2SO_4$, and subjected to a 20 second 12.5 volt peak a-c electrodeposition treatment to deposit Ag in the bottoms of the pores. The foil was then rinsed and dried. Messages were rubber-stamped on to the coloured surface using epoxy resin, then the foil was heat seal laminated with a non-porous plastic film.

The result was a deep blue laminate with hidden message that when peeled to delaminate, exposed the message in blue on an emerald green background.

EXAMPLE 5—A DECORATIVE ALUMINUM FINISH

In this Example, a coloured optical interference structure was produced which comprised two metallic layers, namely nickel and aluminum, separated by an optically thin layer of porous, anodic alumina according to FIG. 2. The coloured surface was coated with a clear protective lacquer. The result was an attractively coloured (purple) extrusion suitable for in-door usage. The device was produced as follows.

An aluminum extrusion (AA6463) was cut to a 15 cm length, etched in a 70° C. 5% sodium hydroxide solution, and rinsed. The extrusion was then anodized in 1 molar phosphoric acid at 31° C. for 45 seconds using 25 volts d-c. After rinsing, the extrusion was immersed for 15 seconds in a dilute, acidic, stannous chloride solution; rinsed; and then dipped in a dilute, acidic, palladium chloride solution for an additional 15 seconds. Upon rinsing the panel was given a short term electroless nickel treatment in a commercially available solution. The extrusion was then re-anodized as above for a period of 105 seconds, rinsed, and dried. Clear lacquer was then sprayed on to the surface and allowed to air dry.

EXAMPLE 6—COLOUR CHANGES LABEL WITH LATENT MESSAGE

In this Example, an optical structure was formed comprising two metallic layers, namely nickel and aluminum, separated by an optically thin layer of porous, anodic alumina according to FIG. 2. A co-planar weakened zone within the oxide, according to FIG. 5(e), allowed separation of the two metallic layers hence irreversible destruction of the blue interference colour generated by the intact structure. Separation of the layers was facilitated by a heat sealed polyethylene/polyester top coat laminate which could be easily grasped and pulled without tearing. Latent images in the form of company logos appeared upon peeling the top coat in areas where the porous oxide had been reinforced (and thus remained intact) with a UV curable lacquer. A Flexographic printing technique was used to apply the lacquer. The structure was produced as follows.

70 micron aluminum foil (alloy AA3003) was cut into a 9 by 15 cm panel, precleaned, and rinsed. The panel was then anodized in 1 molar phosphoric acid at 31° C. for 30 seconds using 15 volts d-c. After rinsing, the panel was immersed for 5 seconds in a dilute, acidic, stannous chloride solution; rinsed; and then dipped in a dilute, acidic, palladium chloride solution for an additional 5 seconds. Upon rinsing the panel was given a short term electroless nickel treatment in a commercially available solution. Then panel was then reanodized as above for a period of 115 seconds whereupon the voltage was incrementally reduced by 0.5 volts every 6 seconds. Then panel was allowed to soak at 0 volts for a period of 80 seconds. Upon rinsing and drying, a clear UV curable lacquer was Flexographically printed in message format over the now coloured surface. Volatiles were removed by heat and the lacquer was cured under UV light. The coloured surface was then heat seal laminated using a 125 micron polyethylene/ polyester top coat.

EXAMPLE 7—DICHROIC BAR CODE TRANSFER LABEL

According to this Example, an optical structure was formed which comprised two metallic layers, namely nickel and aluminum, separated by an optically thin layer of porous, anodic alumina according to FIG. 2. The film was additionally silk screened in a pattern negative to that of a bar code with a clear lacquer, i.e. in all areas except the bar code lines. The result was a deep blue bar code contrasted against a yellowish green background. The colour of this bar code changed to red, then yellow, as the viewing angle was adjusted from normal incidence to 45° then to 70°. A thin pressure sensitive top coat protected the surface, and a transfer adhesive bottom coat facilitated labelling of merchandise. The structure was produced as follows.

A 50 micron thick aluminum/polyester laminate was cut into a 9×15 cm panel, pre-cleaned, and rinsed. The panel was then anodized in 1 molar phosphoric acid at 30° C. for 60 seconds using 10 volts d-c. After rinsing, the panel was immersed for 60 seconds in a dilute, acidic, strannous chloride solution; rinsed, and then dipped in a dilute, acidic, palladium chloride solution for an additional 30 seconds. Upon rinsing the panel was given a short term electroless nickel treatment in a proprietary bath at a reduced operating temperature. The panel was then reanodized as above for a period of 25 seconds whereupon the voltage was incrementally reduced by 0.5 volts every 25 seconds but only until 4.5 volts was attained to increase the porosity of the anodic oxide. The panel was then removed, rinsed, and dried. A clear UV curable lacquer was silk screen printed over the now coloured surface in a pattern negative to that of bar codes. Following a curing step under UV light, a 12 micron pressure sensitive top coat was applied to the top surface and a paper backed transfer adhesive was applied to the back surface.

EXAMPLE 8—DICHROIC FOIL

In this Example, an optical structure was produced which comprised two metallic layers, namely tantalum and aluminum, separated by an optically thin layer of porous, anodic alumina according to FIG. 2. The colour of the structure changed from violet (when viewed at normal incidence) to red (when viewed at a 45 degree angle). The structure was produced as follows.

A 50 micron thick aluminum/polyester laminate was cut into a 9 by 15 cm panel, pre-cleaned and rinsed. The panel was then anodized in 0.4 molar oxalic acid at 23° C. for 240 seconds using 25 volts a-c rms. After rinsing and drying the panel was sputter coated (on the anodized aluminum side) with 100 angstroms of tantalum.

EXAMPLE 9—SENSOR

In this Example, an optical structure was produced which comprised two metallic aluminum layers separated by an optically thin layer of porous, anodic alumina according to FIG. 2. Upon absorption of moisture the colour of this material's surface changes from yellow to deep violet. The structure was produced as follows.

A 50 micron thick aluminum/polyester laminate was cut into a 9 by 15 cm panel, pre-cleaned, and rinsed. The panel was then anodized in 1 molar phosphoric acid at 31° C. for 270 seconds using 10 volts d-c. After rinsing and drying the panel was sputter coated (on the anodized aluminum side) with 150 angstroms of aluminum.

EXAMPLE 10—TEMPERATURE/TIME INDICATOR

In this Example, an optical structure was produced which comprised two metallic aluminum layers separated by an optically thin layer of porous, anodic alumina according to FIG. 2. Glycerol, impregnated into the porous oxide, evaporated from the surface at a rate determined by the temperature to which the indicator was exposed. As the glycerol evaporated, the colour of the device changed from deep violet to yellow (as will be seen from FIG. 9 which is a graph plotting reflectance against wavelength for the structure as processed and following impregnation). The structure was produced as follows.

A 50 micron thick aluminum/polyester laminate was cut into a 9 by 15 cm panel, pre-cleaned, and rinsed. The panel was then anodized in 1 molar phosphoric acid at 31° C. for 270 seconds using 10 volts d-c. After rinsing and drying the panel was sputter coated (on the anodized aluminum side) with 150 angstroms of aluminum. The surface was then impregnated with a thin coating of glycerol (3 g/m$^2$) via roller coating. When placed in an oven at 125° C. the colour changed from deep violet to yellow at 4 minutes exposure.

Figure 10:
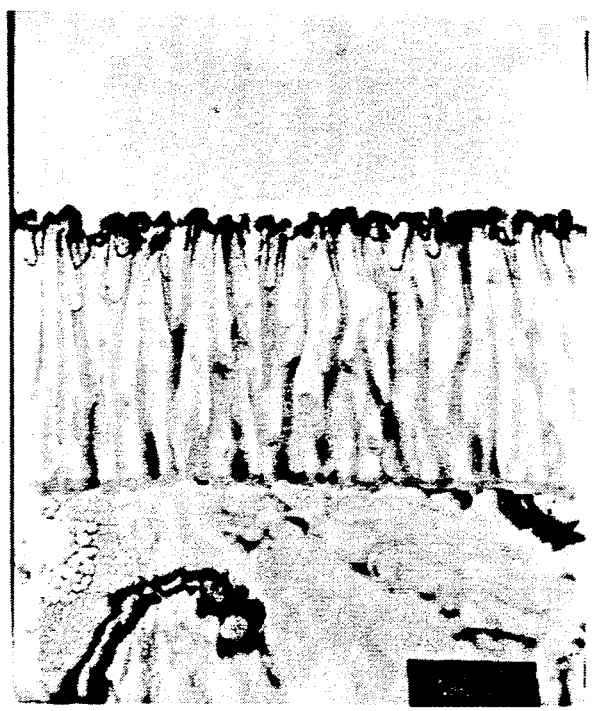

FIG. 10 is a photomicrograph showing a cross-section of the resulting structure. The substrate 10, porous dielectric film 11 and surface metal deposits can clearly be seen in the figure.

EXAMPLE 11

A 50 micron thick aluminum foil/polyester laminate was cathodically cleaned and subsequently anodized for 270 seconds using 15 volts d-c in 120 g/l phosphoric acid maintained at 30° C. After rinsing a small amount of palladium was then electro-deposited at the bottoms of pores by applying a 20 second 10 volt a-c rms treatment to the material suspended in a dilute palladium nitro sulfate solution. After rinsing the panel was immersed in a proprietary electroless nickel solution at 73° C. for 20 seconds. Following a rinse, the panel was re-anodized as above for a period of 90 seconds whereupon the voltage systematically decreased in 0.05 volt steps every 0.6 seconds. When 0 volts was attained, the panel was allowed to soak for 45 seconds, then rinsed and dried.

The colour of the panel "as processed" was purple. When moisture (or other foreign matter) was allowed to condense or soak into the pores, the colour turned distinctly green.

Upon heat seal lamination, the panel appeared green, and this colour was irreversibly destroyed as the laminate was peeled off.

EXAMPLE 12

70 micron thick aluminum foil of alloy AA3003 was anodized for 30 seconds in a room temperature, 165 g/l sulfuric acid electrolyte at 15 volts d-c. Following a water rinse, the same panel was re-anodized in 100 g/l phosphoric acid maintained at 30° C. and 15 volts d-c for an additional 30 seconds. This treatment had the effect of producing an anodic film consisting of asymmetrical pores approximating 0.25 micron in depth. A 30 second electro-deposited treatment in palladium followed where a 15 volt a-c potential was applied across a graphite counter electrode. The panel was subsequently rinsed and re-anodized in the phosphoric acid electrolyte using conditions described above for a period of 5 seconds whereupon the voltage was by 0.5 volts every additional 5 seconds. When the voltage reached 0 volts, the panel was allowed to soak for 30 seconds. After rinsing the panel was immersed in a proprietary electroless nickel solution maintained at 80° C. for a period of 25 seconds.

The deep maroon colour of the panel was destroyed when the surface was laminated with a clear polymer that was subsequently peeled off.

EXAMPLE 13

A 50 micron thick aluminum foil/polyester laminate was cathodically cleaned and subsequently anodized for 270 seconds using 15 volts d-c in 120 g/l phosphoric acid maintained at 30° C. After rinsing, a small amount of nickel was electro-deposited into the bottoms of the pores by applying a 40 second 10 volt a-c rms to the material suspended in a nickel sulfate/boric acid solution. After rinsing, the panel was immersed in a dilute palladium nitro-sulfate solution for 2 minutes (during this time the nickel deposit walls were chemically displaced by palladium). Following a rinse, the panel was re-anodized, as above, for a period of 90 seconds, whereupon the voltage was systematically reduced in 0.05 volt steps every 0.6 seconds. When 0 volts was attained, the panel was allowed to soak for 45 seconds, then rinsed and dried.

The colour of the panel "as processed" was purple. When moisture (or other foreign matter) was allowed to condense or soak into the pores, the colour turned distinctly green.

Upon heat seal lamination, the panel appeared green and this colour was irreversibly destroyed as the top coat laminate was peeled off.

EXAMPLE 14—DICHROIC FOIL

In this Example, an optical structure was formed comprising three metallic layers, namely niobium, cobalt, and aluminum according to FIG. 5(a). The niobium and cobalt layers were separated by an optically thin layer of porous, anodic alumina. The aluminum (substrate) was separated from the cobalt layer by an optically thin layer of non-porous anodic alumina. The colour of this device changed from violet to yellow as the viewing angle was adjusted from normal to 45 degrees. The structure was produced as follows.

70 micron aluminum foil (alloy AA3003) was cut into a 9 by 15 cm panel, precleaned, and rinsed. The panel was then anodized in 1.6 molar sulphuric acid at 22° C. for 75 seconds using 15 volts a-c peak. After rinsing, the panel was immersed in an electrolyte (containing cobalt sulfate, magnesium sulfate, tartaric and boric acid) and, with a graphite counter electrode, a-c voltage was swept up to 15 volts peak and maintained for 30 seconds. Upon rinsing and drying the panel was sputter coated with 100 angstroms of niobium.

EXAMPLE 15—COLOUR CHANGE LABEL WITH LATENT MESSAGE

In this Example, an optical structure was formed which comprised three metallic layers, namely nickel, nickel, and aluminum according to FIG. 5(a). The two nickel layers were separated by an optically thin layer of porous, anodic alumina. The aluminum (substrate) was separated from the middle nickel layer by an optically thin layer of non-porous anodic alumina. A co-planar weakened zone within the porous anodic oxide according to FIG. 5(k) allowed separation of the deposited metal layers resulting in the occurrence of an irreversible colour change from the original green to a bronze interference colour.

Separation of the layers was facilitated by a heat sealed polyethylene/polyester top coat laminate which could be easily grasped and pulled without tearing. A latent image appeared upon peeling the top coat in areas where the porous oxide had been reinforced (and thus remained intact) with a UV curable lacquer. A Flexographic printing technique was used to apply the lacquer. The structure was produced as follows.

A 50 micron aluminum foil (alloy AA1100) cut into a 7 by 10 cm panel, pre-cleaned, and rinsed. The panel was then anodized in 1 molar phosphoric acid at 30° C. for 30 seconds using 15 volts d-c. After rinsing, the panel was immersed for 90 seconds in a dilute, acidic, stannous chloride solution; rinsed, and then dipped in a dilute, acidic, palladium chloride solution for an additional 45 seconds. Upon rinsing the panel was given a short term electroless nickel treatment in a proprietary bath at a reduced operating temperature. The panel was then re-anodized as above for a period of 20 seconds following this, the voltage was incrementally reduced by 0.5 volts every 6 seconds. Upon completion of a 20 second soak at 0 volts, the voltage was swept back to 15 volts and maintained for 90 seconds. After rinsing, the panel was immersed in an electrolyte (containing nickel sulfate, magnesium sulfate, tartaric and boric acid) and, with a graphite counter electrode, a-c voltage was swept up to 15 volts peak and maintained for 20 seconds to deposit Ni at the bottom of the pores. Upon rinsing and drying, a clear UV curable lacquer was flexographically printed in message format over the now coloured surface. Volatiles were removed by heat and the lacquer was cured under UV light. The coloured surface was then heat seal laminated with a 125 micron polyethylene/polyester top coat.

COLOR CHANGE AND INDICATOR FOILS

In Examples 13, 14 and 15, coloured structures consisting of optically thin porous oxides on aluminum were prepared such that these oxides contained a transparent metal layer buried within the porous region of the oxide film according to FIG. 3 and a structurely weakened zone was inserted within the oxide below this metal layer according to FIG. 5(f). The results were peelable coloured finishes produced on aluminum foil.

What we claim is:

1. An optical interference structure which comprises:
    a reflective substrate;
    a porous transparent dielectric film on said reflective substrate, said film having an outer surface opposite to said reflective substrate; and
    at least one semi-transparent reflective layer supported by said porous dielectric film;
    said structure having at least two reflective surfaces separated by an optically thin porous layer of said dielectric film having a thickness between said reflective surfaces in the range of 24 nm to 3 μm, one of said surfaces being present at said outer surface of said film.

2. A structure according to claim 1 wherein said transparent dielectric film is optically thin.

3. A structure according to claim 1 having only one semi-transparent porous layer, said semi-transparent porous layer being supported on said outer surface of said film.

4. A structure according to claim 1 having only one semi-transparent porous layer supported by said film between said outer surface and said substrate.

5. A structure according to claim 1 having only one semi-transparent reflective layers, one of which is supported by said outer surface of said film and the other of which is supported within said film.

6. A structure according to claim 1 having only one semi-transparent reflective layers, both of which are supported within said film between said outer surface and said substrate.

7. A structure according to claim 1, wherein said dielectric film has a porosity of at least 5% by volume.

8. An optical interference structure which comprises:
    a reflective substrate;
    a porous transparent dielectric film on said reflective substrate, said film having an outer surface opposite to said reflective substrate; and
    at least one semi-transparent reflective layer supported by said porous dielectric film;
    said structure having at least two reflective surfaces separated by an optically thin porous layer of said dielectric film, one of said surfaces being present at said outer surface of said film; and said structure having a weakened stratum in said porous film between said outer surface and said substrate.

9. An optical interference structure which comprises:
a reflective substrate;
a porous transparent dielectric film on said reflective substrate, said film having an outer surface opposite to said reflective substrate; and
at least one semi-transparent reflective layer supported by said porous dielectric film;
said structure having at least two reflective surfaces separated by an optically thin porous layer of said dielectric film, one of said surfaces being present at said outer surface of said film; and
said structure having a weakened stratum in said porous film between said outer surface and said substrate, the position of said stratum being such that, upon separation of said film along said stratum, a change of colour is observed.

10. An optical interference structure which comprises:
a reflective substrate;
a porous transparent dielectric film on said reflective substrate, said film having an outer surface opposite to said reflective substrate; and
at least one semi-transparent reflective layer supported by said porous dielectric film;
said structure having at least two reflective surfaces separated by an optically thin porous layer of said dielectric film, one of said surfaces being present at said outer surface of said film; and
wherein said film contains a weakened stratum between said outer surface and said substrate formed by at least one voltage reduction step during the formation of the anodic film.

11. An optical interference structure which comprises:
a reflective substrate;
a porous transparent dielectric film on said reflective substrate, said film having an outer surface opposite to said reflective substrate; and
at least one semi-transparent reflective layer supported by said porous dielectric film;
said structure having at least two reflective surfaces separated by an optically thin porous layer of said dielectric film, one of said surfaces being present at said outer surface of said film; and
wherein said film has a weakened stratum between said outer surface and said substrate.

12. An optical interference structure which comprises:
a reflective substrate;
a porous transparent dielectric film on said reflective substrate, said film having an outer surface opposite to said reflective substrate; and
at least one semi-transparent reflective layer supported by said porous dielectric film;
said structure having at least two reflective surfaces separated by an optically thin porous layer of said dielectric film, one of said surfaces being present at said outer surface of said film; and
wherein said film has a weakened stratum between said semi-transparent porous layer and said stratum.

13. An optical interference structure which comprises:
a reflective substrate;
a porous transparent dielectric film on said reflective substrate, said film having an outer surface opposite to said reflective substrate; and
at least one semi-transparent reflective layer supported by said porous dielectric film;
said structure having at least two reflective surfaces separated by an optically thin porous layer of said dielectric film, one of said surfaces being present at said outer surface of said film; and
wherein said film has a weakened stratum between said semi-transparent porous layer and said substrate.

14. An optical interference structure which comprises:
a reflective substrate;
a porous transparent dielectric film on said reflective substrate, said film having an outer surface opposite to said reflective substrate; and
at least one semi-transparent reflective layer supported by said porous dielectric film;
said structure having at least two reflective surfaces separated by an optically thin porous layer of said dielectric film, one of said surfaces being present at said outer surface of said film; and
wherein said film has a weakened stratum between said semi-transparent porous layer supported within said film and said outer surface.

15. An optical interference structure which comprises:
a reflective substrate;
a porous transparent dielectric film on said reflective substrate, said film having an outer surface opposite to said reflective substrate; and
at least one semi-transparent reflective layer supported by said porous dielectric film;
said structure having at least two reflective surfaces separated by an optically thin porous layer of said dielectric film, one of said surfaces being present at said outer surface of said film; and
wherein said film has a weakened stratum between said semi-transparent reflective layer supported within said film and said substrate.

16. An optical interference structure which comprises:
a reflective substrate;
a porous transparent dielectric film on said reflective substrate, said film having an outer surface opposite to said reflective substrate; and
at least one semi-transparent reflective layer supported by said porous dielectric film;
said structure having at least two reflective surfaces separated by an optically thin porous layer of said dielectric film, one of said surfaces being present at said outer surface of said film; and
wherein said film has a weakened stratum between an outermost one of said semi-transparent reflective layers and said outer surfaces.

17. An optical interference structure which comprises:
a reflective substrate;
a porous transparent dielectric film on said reflective substrate, said film having an outer surface opposite to said reflective substrate; and
at least one semi-transparent reflective layer supported by said porous dielectric film;
said structure having at least two reflective surfaces separated by an optically thin porous layer of said dielectric film, one of said surfaces being present at said outer surface of said film; and wherein said film has a weakened stratum between an outermost one of said semi-transparent reflective layers and an innermost of said semi-transparent reflective layers.

18. An optical interference structure which comprises:
   a reflective substrate;
   a porous transparent dielectric film on said reflective substrate, said film having an outer surface opposite to said reflective substrate; and
   at least one semi-transparent reflective layer supported by said porous dielectric film;
   said structure having at least two reflective surfaces separated by an optically thin porous layer of said dielectric film, one of said surfaces being present at said outer surface of said film; and
   wherein said film has a weakened stratum between an innermost one of said semi-transparent reflective layers and said substrate.

19. An optical interference structure which comprises:
   a reflective substrate;
   an optically thin porous transparent dielectric film on said reflective substrate, said film having a thickness in the range of 24 nm to 3 $\mu$m; and
   at least one semi-transparent reflective layer supported by said dielectric film.

20. A process for producing an optical interference structure, which comprises:
   forming a porous transparent dielectric film on a reflective substrate, said film having an outer surface opposite to said reflective substrate;
   supporting at least one semi-transparent reflective layer on or within said film;
   the thickness of the film and/or positioning of the at least one semi-transparent reflective layer being controlled in such a way that the resulting structure has at least two reflective surfaces separated by an optically thin porous layer of said dielectric film having a thickness in the range of 24 nm to 3 $\mu$m, one of said surfaces being present at said outer surface of said film.

21. A process according to claim 20 wherein said porous transparent dielectric film is formed in such a way that the resulting film is optically thin.

22. A process according to claim 20 wherein said reflective substrate is a metal which can be porous anodized and said porous transparent dielectric film is formed by porous anodizing said substrate.

23. A process according to claim 22 for positioning said semi-transparent reflective layer within the porous dielectric film at positions within the pores of said film between innermost and outermost ends thereof, wherein a pigment is deposited at the innermost ends of pores of said film, said pigment is protected against attack by electrolyte used for porous anodization, and the resulting structure is then subjected to further porous anodization to increase the thickness of said porous film between said pigment and said substrate.

24. A process according to claim 23 wherein said pigment is deposited by electro-deposition of a metal that is susceptible to attack by electrolyte used for porous anodization and said pigment is protected against attack by said electrolyte by immersion plating said metal with a noble metal.

25. A process according to claim 23 wherein said pigment is deposited by electrodepositing a noble metal in said pores in amounts sufficient to act as seeds for subsequent electroless plating and then said seeds are enlarged by electroless plating prior to subjecting the resulting structure to further porous anodization.

26. A process according to claim 23 wherein said pigment is deposited by electrodepositing a noble metal in said pores in amounts sufficient to act as seeds for subsequent electroless plating, the resulting structure is subjected to further porous anodization and then said seeds are enlarged by electroless plating.

27. A process for producing an optical interference structure, which comprises:
   forming a porous transparent dielectric film on a reflective substrate; and
   supporting at least one semi-transparent reflective layer on or within said film;
   the thickness of the film and/or positioning of the at least one semi-transparent reflective layer being controlled in such a way that the resulting structure has at least two reflective surfaces separated by an optically thin porous layer of said dielectric film one of said surfaces being present at said outer surface of said film; and which includes forming a weakened stratum within said porous dielectric film so that said film may be subsequently separated along said weakened stratum.

28. A process for producing an optical interference structure, which comprises:
   forming a porous transparent dielectric film on a reflective substrate; and
   supporting at least one semi-transparent reflective layer on or within said film;
   the thickness of the film and/or positioning of the at least one semi-transparent reflective layer being controlled in such a way that the resulting structure has at least two reflective surfaces separated by an optically thin porous layer of said dielectric film one of said surfaces being present at said outer surface of said film; and
   wherein said reflective substrate is a metal which can be porous anodized and said porous transparent dielectric film is formed by porous anodizing said substrate, and
   wherein a weakened stratum is formed in said porous dielectric film by a voltage reduction procedure carried out during a porous anodization step of said substrate.

29. A process for producing an optical interference structure, which comprises:
   forming a porous transparent dielectric film on a reflective substrate; and
   supporting at least one semi-transparent reflective layer on or within said film;
   the thickness of the film and/or positioning of the at least one semi-transparent reflective layer being controlled in such a way that the resulting structure has at least two reflective surfaces separated by an optically thin porous layer of said dielectric film one of said surfaces being present at said outer surface of said film; and
   wherein said reflective substrate is a metal which can be porous anodized and said porous transparent dielectric film is formed by porous anodizing said substrate; and
   wherein a weakened stratum is formed in said porous dielectric film by a voltage reduction procedure carried out during a voltage reduction step of said substrate, the voltage reduction step being carried out at such a time during the process that the weakened stratum is positioned within the resulting structure such that a colour change occurs when said film is separated along said weakened stratum.

30. A process for producing an optical interference structure, which comprises:

forming a porous transparent dielectric film on a reflective substrate; and supporting at least one semi-transparent reflective layer on or within said film;

the thickness of the film and/or positioning of the at least one semi-transparent reflective layer being controlled in such a way that the resulting structure has at least two reflective surfaces separated by an optically thin porous layer of said dielectric film one of said surfaces being present at said outer surface of said film; and which includes forming a weakened stratum within said porous dielectric film so that said film may be subsequently separated along said weakened stratum, and a reinforcing material is introduced into said pores in limited area of said film in order to prevent said subsequent separation in said limited areas.

* * * * *